United States Patent
Tyler et al.

(10) Patent No.: US 10,040,240 B1
(45) Date of Patent: Aug. 7, 2018

(54) ADDITIVE MANUFACTURING SYSTEM HAVING FIBER-CUTTING MECHANISM

(71) Applicant: CC3D LLC, Coeur d'Alene, ID (US)

(72) Inventors: Kenneth Lyle Tyler, Coeur d'Alene, ID (US); Trevor David Budge, Coeur d'Alene, ID (US); Jeff Beebout, Post Falls, ID (US)

(73) Assignee: CC3D LLC, Coeur d'Alene, ID (US)

( * ) Notice: Subject to any disclaimer, the term of this patent is extended or adjusted under 35 U.S.C. 154(b) by 0 days.

(21) Appl. No.: 15/623,881

(22) Filed: Jun. 15, 2017

Related U.S. Application Data (60) Provisional application No. 62/449,899, filed on Jan. 24, 2017, provisional application No. 62/459,398, filed on Feb. 15, 2017.

(51) Int. Cl.
  *B29C 64/209* (2017.01)
  *B33Y 30/00* (2015.01)
  (Continued)

(52) U.S. Cl.
  CPC ............ *B29C 64/209* (2017.08); *B23K 26/38* (2013.01); *B23K 26/402* (2013.01); *B26D 7/086* (2013.01); *B29C 64/165* (2017.08); *B29C 64/232* (2017.08); *B29C 64/268* (2017.08); *B29C 64/393* (2017.08); *B33Y 30/00* (2014.12); *B23K 2203/38* (2015.10); *B29C 64/35* (2017.08); *B33Y 50/02* (2014.12)

(58) Field of Classification Search
  None
  See application file for complete search history.

(56) References Cited

U.S. PATENT DOCUMENTS 3,286,305 A 11/1966 Seckel
3,809,514 A 5/1974 Nunez
(Continued)

FOREIGN PATENT DOCUMENTS

DE 4102257 A1 7/1992
EP 1932636 A1 6/2008
(Continued)

OTHER PUBLICATIONS

International Search Report, dated Oct. 17, 2017 for PCT US/17/46338, filed Aug. 10, 2017 for CC3D LLC.
(Continued)

*Primary Examiner* — Joseph S Del Sole
*Assistant Examiner* — Manley L Cummins, IV
(74) *Attorney, Agent, or Firm* — Ryan C. Stockett (57) ABSTRACT

A system is disclosed for use in additively manufacturing a composite structure. The system may include a head having a nozzle configured to discharge a composite material, including a matrix and a continuous reinforcement. The system may also include a cure enhancer configured to enhance curing of the matrix, and a support configured to move the head during discharging to create a structure having a three-dimensional trajectory. The system may further include a cutting mechanism operatively mounted to at least one of the head and the support, and configured to sever the continuous reinforcement after discharge from the nozzle. The cutting mechanism may include a blade, and an ultrasonic energy source connected to the blade.

7 Claims, 6 Drawing Sheets

(51) Int. Cl.
*B29C 64/165* (2017.01)
*B29C 64/393* (2017.01)
*B29C 64/232* (2017.01)
*B29C 64/268* (2017.01)
*B26D 7/08* (2006.01)
*B23K 26/38* (2014.01)
*B23K 26/402* (2014.01)
*B33Y 50/02* (2015.01)
*B23K 103/00* (2006.01)
*B29C 64/35* (2017.01)

(56) References Cited

U.S. PATENT DOCUMENTS

| | | | |
|---|---|---|---|
| 3,984,271 A | 10/1976 | Gilbu | |
| 3,993,726 A | 11/1976 | Moyer | |
| 4,373,412 A | 2/1983 | Gerber et al. | |
| 4,500,372 A | 2/1985 | Mion | |
| 4,643,940 A | 2/1987 | Shaw et al. | |
| 4,671,761 A | 6/1987 | Adrian et al. | |
| 4,822,548 A | 4/1989 | Hempel | |
| 4,851,065 A | 7/1989 | Curtz | |
| 4,987,808 A | 1/1991 | Sicka et al. | |
| 5,002,712 A | 3/1991 | Goldmann et al. | |
| 5,037,691 A | 8/1991 | Medney et al. | |
| 5,296,335 A | 3/1994 | Thomas et al. | |
| 5,340,433 A * | 8/1994 | Crump | B22F 3/115 118/202 |
| 5,746,967 A | 5/1998 | Hoy et al. | |
| 5,866,058 A | 2/1999 | Batchelder et al. | |
| 5,936,861 A | 8/1999 | Jang et al. | |
| 6,153,034 A | 11/2000 | Lipsker | |
| 6,459,069 B1 | 10/2002 | Rabinovich | |
| 6,501,554 B1 | 12/2002 | Hackney et al. | |
| 6,803,003 B2 | 10/2004 | Rigali et al. | |
| 6,934,600 B2 | 8/2005 | Jang et al. | |
| 7,795,349 B2 | 9/2010 | Bredt et al. | |
| 8,221,669 B2 | 7/2012 | Batchelder et al. | |
| 8,962,717 B2 | 2/2015 | Roth et al. | |
| 9,126,365 B1 | 9/2015 | Mark et al. | |
| 9,126,367 B1 | 9/2015 | Mark et al. | |
| 9,149,988 B2 | 10/2015 | Mark et al. | |
| 9,156,205 B2 | 10/2015 | Mark et al. | |
| 9,186,846 B1 | 11/2015 | Mark et al. | |
| 9,186,848 B2 | 11/2015 | Mark et al. | |
| 9,327,452 B2 | 5/2016 | Mark et al. | |
| 9,327,453 B2 | 5/2016 | Mark et al. | |
| 9,370,896 B2 | 6/2016 | Mark | |
| 9,381,702 B2 | 7/2016 | Hollander | |
| 9,457,521 B2 | 10/2016 | Johnston et al. | |
| 9,458,955 B2 | 10/2016 | Hammer et al. | |
| 9,527,248 B2 | 12/2016 | Hollander | |
| 9,539,762 B2 | 1/2017 | Durand et al. | |
| 9,579,851 B2 | 2/2017 | Mark et al. | |
| 9,688,028 B2 | 6/2017 | Mark et al. | |
| 9,694,544 B2 | 7/2017 | Mark et al. | |
| 9,764,378 B2 | 9/2017 | Peters et al. | |
| 9,770,876 B2 | 9/2017 | Farmer et al. | |
| 9,782,926 B2 | 10/2017 | Witzel et al. | |
| 2002/0009935 A1 | 1/2002 | Hsiao et al. | |
| 2002/0062909 A1 | 5/2002 | Jang et al. | |
| 2002/0113331 A1 | 8/2002 | Zhang et al. | |
| 2002/0165304 A1 | 11/2002 | Mulligan et al. | |
| 2003/0044539 A1 | 3/2003 | Oswald | |
| 2003/0056870 A1 | 3/2003 | Comb et al. | |
| 2003/0160970 A1 | 8/2003 | Basu et al. | |
| 2003/0186042 A1 | 10/2003 | Dunlap et al. | |
| 2003/0236588 A1 | 12/2003 | Jang et al. | |
| 2005/0006803 A1 | 1/2005 | Owens | |
| 2005/0061422 A1 | 3/2005 | Martin | |
| 2005/0104257 A1 | 5/2005 | Gu et al. | |
| 2005/0109451 A1 | 5/2005 | Hauber et al. | |
| 2005/0230029 A1 | 10/2005 | Vaidyanathan et al. | |
| 2007/0003650 A1 | 1/2007 | Schroeder | |
| 2007/0228592 A1 | 10/2007 | Dunn et al. | |
| 2008/0176092 A1 | 7/2008 | Owens | |
| 2009/0095410 A1 | 4/2009 | Oldani | |
| 2010/0043610 A1 * | 2/2010 | Tanaka | B26D 3/10 83/22 |
| 2011/0032301 A1 | 2/2011 | Fienup et al. | |
| 2011/0143108 A1 | 6/2011 | Fruth et al. | |
| 2012/0060468 A1 | 3/2012 | Dushku et al. | |
| 2012/0159785 A1 | 6/2012 | Pyles et al. | |
| 2012/0231225 A1 | 9/2012 | Mikulak et al. | |
| 2012/0247655 A1 | 10/2012 | Erb et al. | |
| 2013/0115324 A1 * | 5/2013 | Hegler | B29C 47/0023 425/133.1 |
| 2013/0164498 A1 | 6/2013 | Langone et al. | |
| 2013/0209600 A1 | 8/2013 | Tow | |
| 2013/0233471 A1 | 9/2013 | Kappesser et al. | |
| 2013/0292039 A1 | 11/2013 | Peters et al. | |
| 2013/0337256 A1 | 12/2013 | Farmer et al. | |
| 2013/0337265 A1 | 12/2013 | Farmer | |
| 2014/0034214 A1 | 2/2014 | Boyer et al. | |
| 2014/0061974 A1 | 3/2014 | Tyler | |
| 2014/0159284 A1 | 6/2014 | Leavitt | |
| 2014/0232035 A1 | 8/2014 | Bheda | |
| 2014/0268604 A1 | 9/2014 | Wicker et al. | |
| 2014/0291886 A1 | 10/2014 | Mark et al. | |
| 2015/0136455 A1 | 5/2015 | Fleming | |
| 2016/0012935 A1 | 1/2016 | Rothfuss | |
| 2016/0031155 A1 | 2/2016 | Tyler | |
| 2016/0046082 A1 | 2/2016 | Fuerstenberg | |
| 2016/0052208 A1 | 2/2016 | Debora et al. | |
| 2016/0082641 A1 | 3/2016 | Bogucki et al. | |
| 2016/0082659 A1 | 3/2016 | Hickman et al. | |
| 2016/0107379 A1 | 4/2016 | Mark et al. | |
| 2016/0114532 A1 | 4/2016 | Schirtzinger et al. | |
| 2016/0136885 A1 | 5/2016 | Nielsen-Cole et al. | |
| 2016/0144565 A1 | 5/2016 | Mark et al. | |
| 2016/0144566 A1 | 5/2016 | Mark et al. | |
| 2016/0192741 A1 | 7/2016 | Mark | |
| 2016/0200047 A1 | 7/2016 | Mark et al. | |
| 2016/0243762 A1 | 8/2016 | Fleming et al. | |
| 2016/0263806 A1 | 9/2016 | Gardiner | |
| 2016/0263822 A1 | 9/2016 | Boyd | |
| 2016/0263823 A1 | 9/2016 | Espiau et al. | |
| 2016/0271876 A1 | 9/2016 | Lower | |
| 2016/0297104 A1 | 10/2016 | Guillemette et al. | |
| 2016/0311165 A1 | 10/2016 | Mark et al. | |
| 2016/0325491 A1 | 11/2016 | Sweeney et al. | |
| 2016/0332369 A1 | 11/2016 | Shah et al. | |
| 2016/0339633 A1 | 11/2016 | Stolyarov et al. | |
| 2016/0346998 A1 | 12/2016 | Mark et al. | |
| 2016/0361869 A1 | 12/2016 | Mark et al. | |
| 2016/0368213 A1 | 12/2016 | Mark | |
| 2016/0368255 A1 | 12/2016 | Witte et al. | |
| 2017/0007359 A1 | 1/2017 | Kopelman et al. | |
| 2017/0007360 A1 | 1/2017 | Kopelman et al. | |
| 2017/0007361 A1 | 1/2017 | Boronkay et al. | |
| 2017/0007362 A1 | 1/2017 | Chen et al. | |
| 2017/0007363 A1 | 1/2017 | Boronkay | |
| 2017/0007365 A1 | 1/2017 | Kopelman et al. | |
| 2017/0007366 A1 | 1/2017 | Kopelman et al. | |
| 2017/0007367 A1 | 1/2017 | Li et al. | |
| 2017/0007368 A1 | 1/2017 | Boronkay | |
| 2017/0007386 A1 * | 1/2017 | Mason | G06Q 50/22 |
| 2017/0008333 A1 | 1/2017 | Mason et al. | |
| 2017/0015059 A1 | 1/2017 | Lewicki | |
| 2017/0015060 A1 | 1/2017 | Lewicki et al. | |
| 2017/0021565 A1 | 1/2017 | Deaville | |
| 2017/0028434 A1 | 2/2017 | Evans et al. | |
| 2017/0028588 A1 | 2/2017 | Evans et al. | |
| 2017/0028617 A1 | 2/2017 | Evans et al. | |
| 2017/0028619 A1 | 2/2017 | Evans et al. | |
| 2017/0028620 A1 | 2/2017 | Evans et al. | |
| 2017/0028621 A1 | 2/2017 | Evans et al. | |
| 2017/0028623 A1 | 2/2017 | Evans et al. | |
| 2017/0028624 A1 | 2/2017 | Evans et al. | |
| 2017/0028625 A1 | 2/2017 | Evans et al. | |
| 2017/0028627 A1 | 2/2017 | Evans et al. | |
| 2017/0028628 A1 | 2/2017 | Evans et al. | |
| 2017/0028633 A1 | 2/2017 | Evans et al. | |
| 2017/0028634 A1 | 2/2017 | Evans et al. | |

(56) References Cited

U.S. PATENT DOCUMENTS

| | | | |
|---|---|---|---|
| 2017/0028635 A1 | 2/2017 | Evans et al. | |
| 2017/0028636 A1 | 2/2017 | Evans et al. | |
| 2017/0028637 A1 | 2/2017 | Evans et al. | |
| 2017/0028638 A1 | 2/2017 | Evans et al. | |
| 2017/0028639 A1 | 2/2017 | Evans et al. | |
| 2017/0028644 A1* | 2/2017 | Evans | B29C 70/384 |
| 2017/0030207 A1 | 2/2017 | Kittleson | |
| 2017/0036403 A1 | 2/2017 | Ruff et al. | |
| 2017/0050340 A1 | 2/2017 | Hollander | |
| 2017/0057164 A1 | 3/2017 | Hemphill et al. | |
| 2017/0057165 A1 | 3/2017 | Waldrop et al. | |
| 2017/0057167 A1 | 3/2017 | Tooren et al. | |
| 2017/0057181 A1 | 3/2017 | Waldrop et al. | |
| 2017/0064840 A1 | 3/2017 | Espalin et al. | |
| 2017/0066187 A1 | 3/2017 | Mark et al. | |
| 2017/0087768 A1 | 3/2017 | Bheda | |
| 2017/0106565 A1 | 4/2017 | Braley et al. | |
| 2017/0120519 A1* | 5/2017 | Mark | B33Y 10/00 |
| 2017/0129170 A1 | 5/2017 | Kim et al. | |
| 2017/0129171 A1 | 5/2017 | Gardner et al. | |
| 2017/0129176 A1 | 5/2017 | Waatti et al. | |
| 2017/0129182 A1 | 5/2017 | Sauti et al. | |
| 2017/0129186 A1 | 5/2017 | Sauti et al. | |
| 2017/0144375 A1 | 5/2017 | Waldrop et al. | |
| 2017/0151728 A1 | 6/2017 | Kunc et al. | |
| 2017/0157828 A1 | 6/2017 | Mandel et al. | |
| 2017/0157831 A1 | 6/2017 | Mandel et al. | |
| 2017/0157844 A1 | 6/2017 | Mandel et al. | |
| 2017/0157851 A1 | 6/2017 | Nardiello et al. | |
| 2017/0165908 A1 | 6/2017 | Pattinson et al. | |
| 2017/0173868 A1* | 6/2017 | Mark | B29C 45/1418 |
| 2017/0182712 A1 | 6/2017 | Scribner et al. | |
| 2017/0210074 A1* | 7/2017 | Ueda | B29C 67/0081 |
| 2017/0217088 A1 | 8/2017 | Boyd et al. | |
| 2017/0232674 A1 | 8/2017 | Mark | |
| 2017/0259502 A1 | 9/2017 | Chapiro et al. | |
| 2017/0259507 A1* | 9/2017 | Hocker | B29C 67/0055 |
| 2017/0266876 A1 | 9/2017 | Hocker | |
| 2017/0266887 A1* | 9/2017 | Roviaro | B29C 67/0088 |
| 2017/0274585 A1 | 9/2017 | Armijo et al. | |
| 2017/0284876 A1 | 10/2017 | Moorlag et al. | |
| 2017/0326817 A1* | 11/2017 | Portet | B29C 69/00 |
| 2018/0015668 A1* | 1/2018 | Koskas | B29C 64/209 |

FOREIGN PATENT DOCUMENTS

| | | |
|---|---|---|
| EP | 2589481 B1 | 1/2016 |
| EP | 3219474 A1 | 9/2017 |
| KR | 100995983 B1 | 11/2010 |
| KR | 101172859 B1 | 8/2012 |
| WO | 2013017284 A2 | 2/2013 |
| WO | 2016088042 A1 | 6/2016 |
| WO | 2016088048 A1 | 6/2016 |
| WO | 2016110444 A1 | 7/2016 |
| WO | 2016159259 A1 | 10/2016 |
| WO | 2016196382 A1 | 12/2016 |
| WO | 2017006178 A1 | 1/2017 |
| WO | 2017006324 A1 | 1/2017 |
| WO | 2017051202 A1 | 3/2017 |
| WO | 2017081253 A1 | 5/2017 |
| WO | 2017085649 A1 | 5/2017 |
| WO | 2017087663 A1 | 5/2017 |
| WO | 2017108758 A1 | 6/2017 |
| WO | 2017122941 A1 | 7/2017 |
| WO | 2017122942 A1 | 7/2017 |
| WO | 2017122943 A1 | 7/2017 |
| WO | 2017123726 A1 | 7/2017 |
| WO | 2017124085 A1 | 7/2017 |
| WO | 2017126476 A1 | 7/2017 |
| WO | 2017126477 A1 | 7/2017 |
| WO | 2017137851 A2 | 8/2017 |
| WO | 2017142867 A1 | 8/2017 |
| WO | 2017150186 A1 | 9/2017 |

OTHER PUBLICATIONS

A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).

A. Endruweit, M. S. Johnson, & A. C. Long, Curing of Composite Components by Ultraviolet Radiation: A Review, Polymer Composites, pp. 119-128 (Apr. 2006).

C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).

Hyouk Ryeol Choi and Se-gon Roh, In-pipe Robot with Active Steering Capability for Moving Inside of Pipelines, Bioinspiration and Robotics: Walking and Climbing Robots, Sep. 2007, p. 544, I-Tech, Vienna, Austria.

International Search Report dated Oct. 13, 2016 for PCT/US2016/042906 to CC3D LLC Filed Jul. 19, 2016.

Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995).

M. Martin-Gallego et al., Epoxy-Graphene UV-Cured Nanocomposites, Polymer, vol. 52, Issue 21, pp. 4664-4669 (Sep. 2011).

P. Compston, J. Schierner, & A. Cvetanovska, Mechanical Properties and Styrene Emission Levels of a UV-Cured Glass-Fibre/Vinylester Composite, Composite Structures, vol. 86, pp. 22-26 (Mar. 2008).

S Kumar & J.-P. Kruth, Composites by Rapid Prototyping Technology, Materials and Design, (Feb. 2009).

S. L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).

T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.

Vincent J. Lopata et al., Electron-Beam-Curable Epoxy Resins for the Manufacture of High-Performance Composites, Radiation Physics and Chemistry, vol. 56, pp. 405-415 (1999).

Yugang Duan et al., Effects of Compaction and UV Exposure on Performance of Acrylate/Glass-Fiber Composites Cured Layer by Layer, Journal of Applied Polymer Science, vol. 123, Issue 6, pp. 3799-3805 (May 15, 2012).

* cited by examiner

ADDITIVE MANUFACTURING SYSTEM HAVING FIBER-CUTTING MECHANISM

RELATED APPLICATIONS

This application is based on and claims the benefit of priority from U.S. Provisional Applications Nos. 62/449,899 that was filed on Jan. 24, 2017 and 62/459,398 that was filed on Feb. 15, 2017, the contents of all of which are expressly incorporated herein by reference.

TECHNICAL FIELD

The present disclosure relates generally to a manufacturing system and, more particularly, to an additive manufacturing system having a fiber-cutting mechanism.

BACKGROUND

Extrusion manufacturing is a known process for producing continuous structures. During extrusion manufacturing, a liquid matrix (e.g., a thermoset resin or a heated thermoplastic) is pushed through a die having a desired cross-sectional shape and size. The material, upon exiting the die, cures and hardens into a final form. In some applications, UV light and/or ultrasonic vibrations are used to speed the cure of the liquid matrix as it exits the die. The structures produced by the extrusion manufacturing process can have any continuous length, with a straight or curved profile, a consistent cross-sectional shape, and excellent surface finish. Although extrusion manufacturing can be an efficient way to continuously manufacture structures, the resulting structures may lack the strength required for some applications.

Pultrusion manufacturing is a known process for producing high-strength structures. During pultrusion manufacturing, individual fiber strands, braids of strands, and/or woven fabrics are coated with or otherwise impregnated with a liquid matrix (e.g., a thermoset resin or a heated thermoplastic) and pulled through a stationary die where the liquid matrix cures and hardens into a final form. As with extrusion manufacturing, UV light and/or ultrasonic vibrations are used in some pultrusion applications to speed the cure of the liquid matrix as it exits the die. The structures produced by the pultrusion manufacturing process have many of the same attributes of extruded structures, as well as increased strength due to the integrated fibers. Although pultrusion manufacturing can be an efficient way to continuously manufacture high-strength structures, the resulting structures may lack the form (shape, size, and/or precision) required for some applications. In addition, conventional pultrusion manufacturing may lack flexibility in severing of the fibers.

The disclosed system is directed to addressing one or more of the problems set forth above and/or other problems of the prior art.

SUMMARY

In one aspect, the present disclosure is directed to an additive manufacturing system. The additive manufacturing system may include a head having a nozzle configured to discharge a composite material, including a matrix and a continuous reinforcement. The additive manufacturing system may also include a cure enhancer configured to enhance curing of the matrix, and a support configured to move the head during discharging to create a structure having a three-dimensional trajectory. The additive manufacturing system may further include a cutting mechanism operatively mounted to at least one of the head and the support, and configured to sever the continuous reinforcement after discharge from the nozzle. The cutting mechanism may include a blade, and an ultrasonic energy source connected to the blade.

In another aspect, the present disclosure is directed to another additive manufacturing system. This additive manufacturing system may include a head having a nozzle configured to discharge a composite material, including a matrix and a continuous reinforcement. The additive manufacturing system may also include a cure enhancer configured to enhance curing of the matrix, and a support configured to move the head during discharging to create a structure having a three-dimensional trajectory. The additive manufacturing system may further include an annular punch at least partially surrounding the nozzle. The annular punch may have a piston located inside a control chamber at a base end, and a cutting blade located opposite the piston. The additive manufacturing system may additionally include a controller in communication with the support, the cure enhancer, and the annular punch. The controller may be configured to regulate operation of the support to cause the head to follow a desired trajectory during discharge of the composite material, to selectively activate the cure enhancer, and to regulate a flow of fluid through the control chamber to cause the annular punch to at least one of extend, retract, and rotate during severing of the continuous reinforcement.

In another aspect, the present disclosure is directed to yet another additive manufacturing system. This additive manufacturing system may include a head having a nozzle configured to discharge a composite material, including a matrix and a continuous reinforcement. The additive manufacturing system may also include a cure enhancer configured to enhance curing of the matrix, and a support configured to move the head during discharging to create a structure having a three-dimensional trajectory. The additive manufacturing system may additionally include a cutting mechanism configured to sever the continuous reinforcement after discharge from the nozzle. The cutting mechanism may include an arm, and an actuator connected to the head and configured to deflect the arm radially inward to engage the continuous reinforcement.

DETAILED DESCRIPTION

Figure 1:
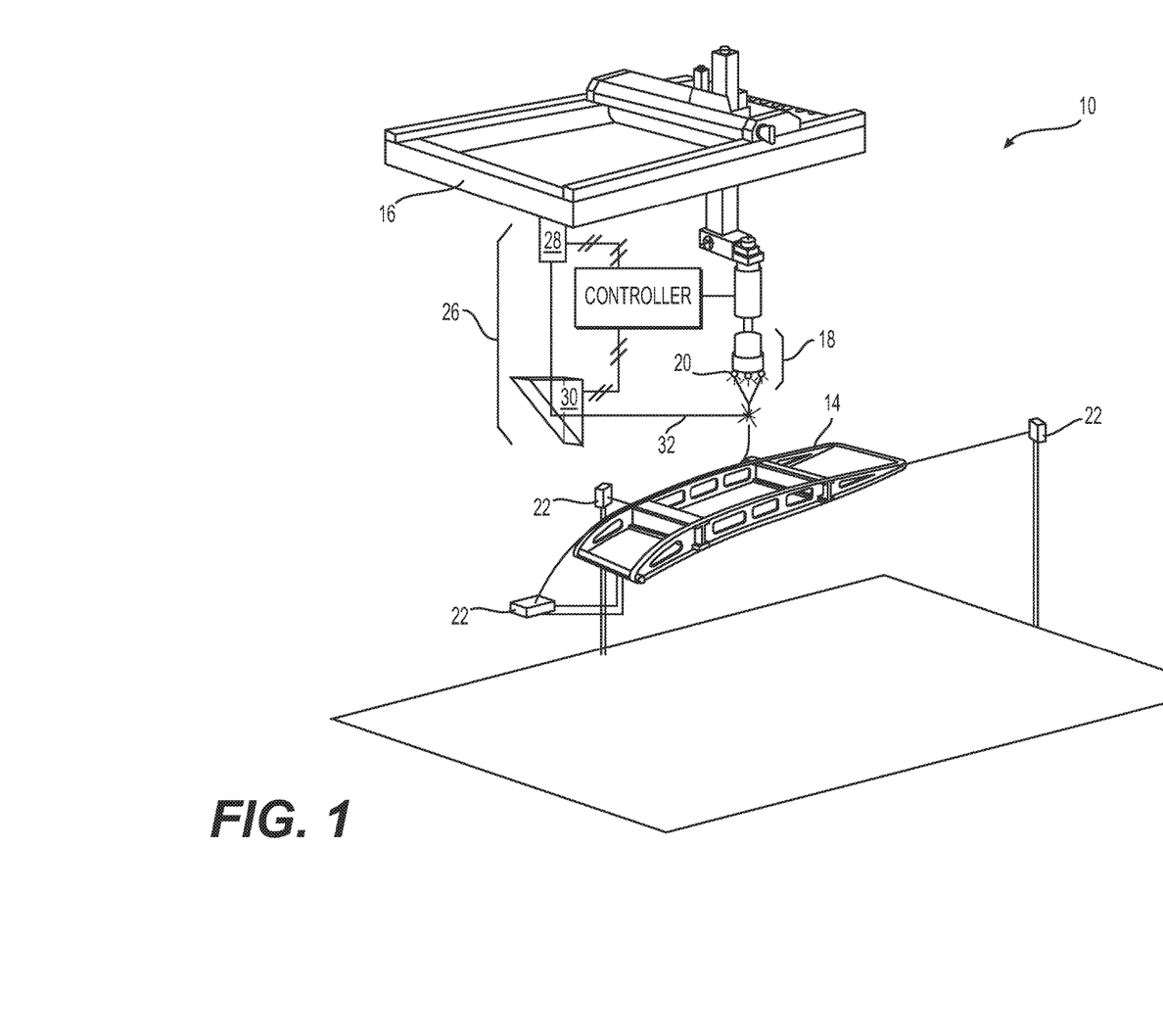
FIGS. 1 and 2 are diagrammatic illustrations of exemplary disclosed manufacturing systems.
Figure 2:
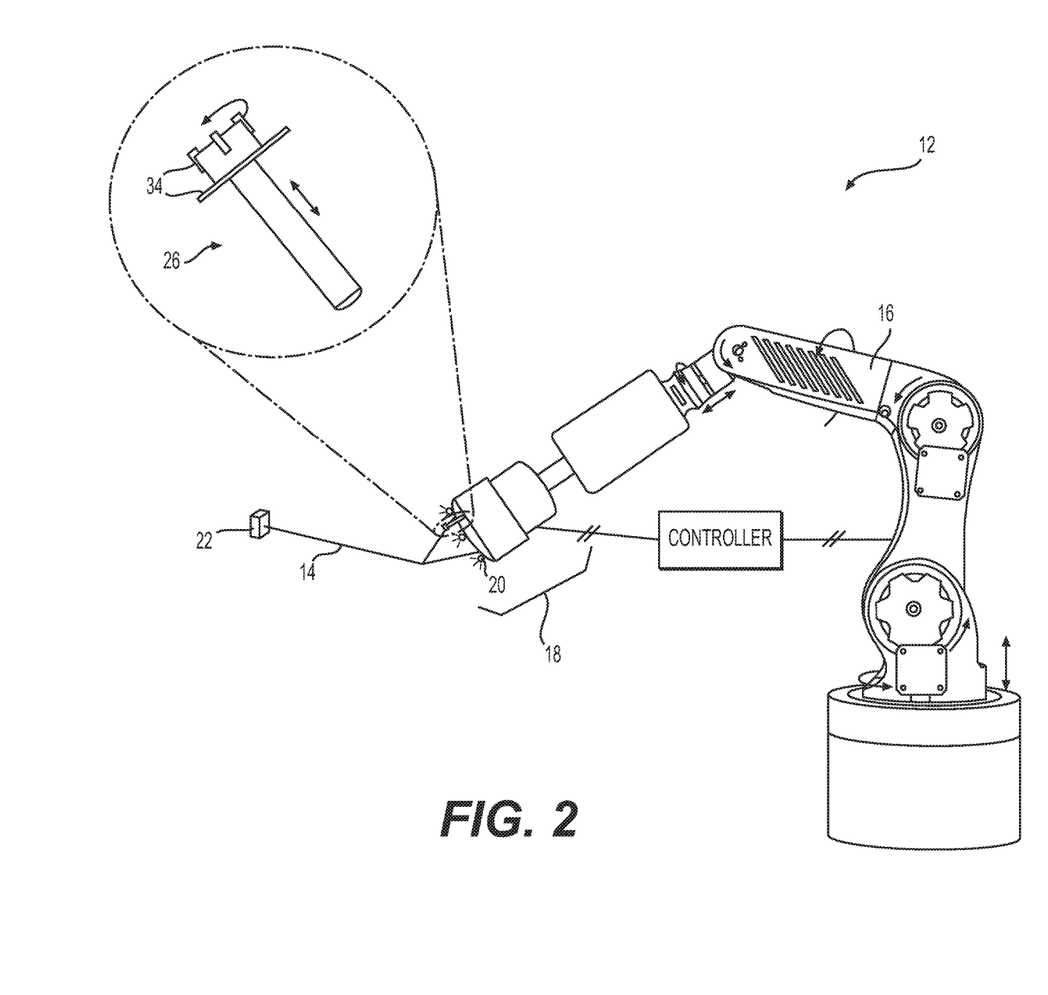

FIGS. 1 and 2 illustrate different exemplary systems 10 and 12, which may be used to continuously manufacture composite structures 14 having any desired cross-sectional shape (e.g., circular, polygonal, etc.). Each of systems 10, 12 may include at least a support 16 and a head 18. Head 18 may be coupled to and moved by support 16. In the disclosed embodiment of FIG. 1, support 16 is an overhead gantry capable of moving head 18 in multiple directions during fabrication of structure 14, such that a resulting longitudinal axis of structure 14 is three-dimensional. In the embodiment of FIG. 2, support 16 is a robotic arm also capable of moving head 18 in multiple directions during fabrication of structure 14. Although supports 16 of both embodiments are shown as being capable of 6-axis movements, it is contemplated that any other type of support 16 capable of moving head 18 in the same or in a different manner could also be utilized, if desired. In some embodiments, a drive may mechanically couple head 18 to support 16, and may include components that cooperate to move and/or supply power or materials to head 18.

Head 18 may be configured to receive or otherwise contain a matrix material. The matrix material may include any type of matrix material (e.g., a liquid resin, such as a zero volatile organic compound resin; a powdered metal; etc.) that is curable. Exemplary resins include thermosets, single- or multi-part epoxy resins, polyester resins, cationic epoxies, acrylated epoxies, urethanes, esters, thermoplastics, photopolymers, polyepoxides, thiols, alkenes, thiol-enes, and more. In one embodiment, the matrix material inside head 18 may be pressurized, for example by an external device (e.g., an extruder or another type of pump—not shown) that is fluidly connected to head 18 via a corresponding conduit (not shown). In another embodiment, however, the pressure may be generated completely inside of head 18 by a similar type of device. In yet other embodiments, the matrix material may be gravity-fed through and/or mixed within head 18. In some instances, the matrix material inside head 18 may need to be kept cool and/or dark to inhibit premature curing; while in other instances, the matrix material may need to be kept warm for the same reason. In either situation, head 18 may be specially configured (e.g., insulated, chilled, and/or warmed) to provide for these needs.

The matrix material may be used to coat, encase, or otherwise surround any number of continuous reinforcements (e.g., separate fibers, tows, rovings, and/or sheets of material) and, together with the reinforcements, make up at least a portion (e.g., a wall) of composite structure 14. The reinforcements may be stored within (e.g., on separate internal spools—not shown) or otherwise passed through head 18 (e.g., fed from external spools). When multiple reinforcements are simultaneously used, the reinforcements may be of the same type and have the same diameter and cross-sectional shape (e.g., circular, square, flat, etc.), or of a different type with different diameters and/or cross-sectional shapes. The reinforcements may include, for example, carbon fibers, vegetable fibers, wood fibers, mineral fibers, glass fibers, metallic wires, optical tubes, etc. It should be noted that the term "reinforcement" is meant to encompass both structural and non-structural types of continuous materials at least partially encased in the matrix material discharging from head 18.

The reinforcements may be exposed to (e.g., at least partially coated with) the matrix material while the reinforcements are inside head 18, while the reinforcements are being passed to head 18, and/or while the reinforcements are discharging from head 18, as desired. The matrix material, dry reinforcements, and/or reinforcements that are already exposed to the matrix material (e.g., wetted reinforcements) may be transported into head 18 in any manner apparent to one skilled in the art.

One or more cure enhancers (e.g., a UV light, an ultrasonic emitter, a laser, a heater, a catalyst dispenser, etc.) 20 may be mounted proximate (e.g., within or on) head 18 and configured to enhance a cure rate and/or quality of the matrix material as it is discharged from head 18. Cure enhancer 20 may be controlled to selectively expose surfaces of structure 14 to energy (e.g., UV light, electromagnetic radiation, vibrations, heat, a chemical catalyst, etc.) during the formation of structure 14. The energy may increase a rate of chemical reaction occurring within the matrix material, sinter the material, harden the material, or otherwise cause the material to cure as it discharges from head 18. In the depicted embodiments, cure enhancer 20 includes multiple LEDs (e.g., 6 different LEDs) that are equally distributed about a center axis of head 18. However, it is contemplated that any number of LEDs or other energy sources could alternatively be utilized for the disclosed purposes and/or arranged in another manner (e.g., unequally distributed, arranged in a row or a box, etc.). For example, the primary and/or auxiliary cure enhancers 20 could be located on an arm (not shown) that trails behind head 18, if desired. The amount of energy produced by cure enhancer 20 may be sufficient to cure the matrix material before structure 14 axially grows more than a predetermined length away from head 18. In one embodiment, structure 14 is completely cured before the axial growth length becomes equal to an external diameter of the matrix-coated reinforcement.

The matrix material and reinforcement may be discharged from head 18 via at least two different modes of operation. In a first mode of operation, the matrix material and reinforcement are extruded (e.g., pushed under fluid pressure and/or mechanical force) from head 18, as head 18 is moved by support 16 to create the 3-dimensional shape of structure 14. In a second mode of operation, at least the reinforcement is pulled from head 18, such that a tensile stress is created in the reinforcement during discharge. In this mode of operation, the matrix material may cling to the reinforcement and thereby also be pulled from head 18 along with the reinforcement, and/or the matrix material may be discharged from head 18 under pressure along with the pulled reinforcement. In the second mode of operation, where the matrix material is being pulled from head 18, the resulting tension in the reinforcement may increase a strength of structure 14, while also allowing for a greater length of unsupported material to have a straighter trajectory (i.e., the tension may act against the force of gravity to provide free-standing support for structure 14).

The reinforcement may be pulled from head 18 as a result of head 18 moving away from an anchor point 22. In particular, at the start of structure-formation, a length of matrix-impregnated reinforcement may be pulled and/or pushed from head 18, deposited onto an anchor point 22, and cured, such that the discharged material adheres to anchor point 22. Thereafter, head 18 may be moved away from anchor point 22, and the relative movement may cause the reinforcement to be pulled from head 18. It should be noted that the movement of reinforcement through head 18 could be assisted (e.g., via internal feed mechanisms), if desired. However, the discharge rate of reinforcement from head 18 may primarily be the result of relative movement between head 18 and anchor point 22, such that tension is created within the reinforcement. It is contemplated that anchor point 22 could be moved away from head 18 instead of or in addition to head 18 being moved away from anchor point 22.

A controller 24 may be provided with system 10 and/or 12, and is shown in FIGS. 1 and 2 as being communicatively coupled with support 16, head 18, and any number and type of cure enhancers 20. Controller 24 may embody a single processor or multiple processors that include a means for controlling an operation of system(s) 10 and/or 12. Controller 24 may include one or more general- or special-purpose processors or microprocessors. Controller 24 may further include or be associated with a memory for storing data such as, for example, design limits, performance characteristics, operational instructions, matrix characteristics, reinforcement characteristics, characteristics of structure 14, and corresponding parameters of each component of system(s) 10 and/or 12. Various other known circuits may be associated with controller 24, including power supply circuitry, signal-conditioning circuitry, solenoid/motor driver circuitry, communication circuitry, and other appropriate circuitry. Moreover, controller 24 may be capable of communicating with other components of system(s) 10 and/or 12 via wired and/or wireless transmission.

One or more maps may be stored in the memory of controller 24 and used during fabrication of structure 14. Each of these maps may include a collection of data in the form of lookup tables, graphs, and/or equations. In the disclosed embodiment, the maps are used by controller 24 to determine desired characteristics of cure enhancers 20, the associated matrix, and/or the associated reinforcements at different locations within structure 14. The characteristics may include, among others, a type, quantity, and/or configuration of reinforcement to be discharged at a particular location within structure 14. Controller 24 may then correlate operation of support 16 (e.g., the location and/or orientation of head 18) and/or the discharge of material from head 18 (a type of material, desired performance of the material, cross-linking requirements of the material, a discharge rate, starting and end locations of particular reinforcements, etc.) with the operation of cure enhancers 20 such that structure 14 is produced in a desired manner.

Controller 24 may be further communicatively coupled with a cutting mechanism 26 that can be located at, on, or adjacent a nozzle end of head 18. Mechanism 26 may be used to selectively sever material (e.g., matrix material and/or continuous reinforcements) discharging from head 18.

In the embodiment of FIG. 1, mechanism 26 includes an energy source 28 that is operatively mounted to support 16, and a targeting prism 30. Energy source 28 may include one or more lasers (e.g., an Excimer laser, a Yb:tungstate laser, a $CO_2$ laser, a Nd:YAG laser, a DPSS laser, or another type of laser known in the art) that are configured to generate one or more energy beams 32 directed through prism 30 and onto the material discharging from head 18 at a desired location. Beam(s) 32 may be capable of heating the material to a level sufficient to burn, melt, ablate, or otherwise cut through the material. In some embodiments, various optics (e.g., lenses, mirrors, gratings, filters, etc.—not shown) may be used to focus, redirect, and/or align beam(s) 32. It is contemplated that energy sources other than lasers could alternatively be used to burn, melt, or ablate the material, if desired. Controller 24 may be in communication with each of the components of mechanism 26, and configured to selectively adjust their operation (e.g., to selectively energize source 28, to position/orient an actuator associated with targeting prism 30, to focus beam(s) 32, etc.) in coordination with a position and/or status of head 18. With this configuration, the discharging material may be selectively severed without causing disruptions in the movement of head 18.

In the embodiment of FIG. 2, cutting mechanism 26 includes a rotary cutter (e.g., a router bit, a grinder blade, a saw blade, etc.) 34 that is attached to and operatively driven by head 18 (e.g., via an internal gear train, via an electric actuator, via a fluid motor, etc.). Rotary cutter 34 may be selectively moved into place via support 16, and driven by head 18 (e.g., rotated) to sever structure 14. In some applications, in addition to rotating, rotary cutter 34 may be selectively plunged out of head 18 at desired locations to sever the discharging material, and then returned back at least partially into head 18 for storage. It is contemplated that, in order for head 18 to move to a position that allows severing of structure 14 by rotary cutter 34 (i.e., so that slack exists in the reinforcements), curing of structure 14 may need to be interrupted for a period of time prior to the severing. Controller 24 may be used to control operation of support 16, head 18, and rotary cutter 34 during the severing operation.

Figure 3A:
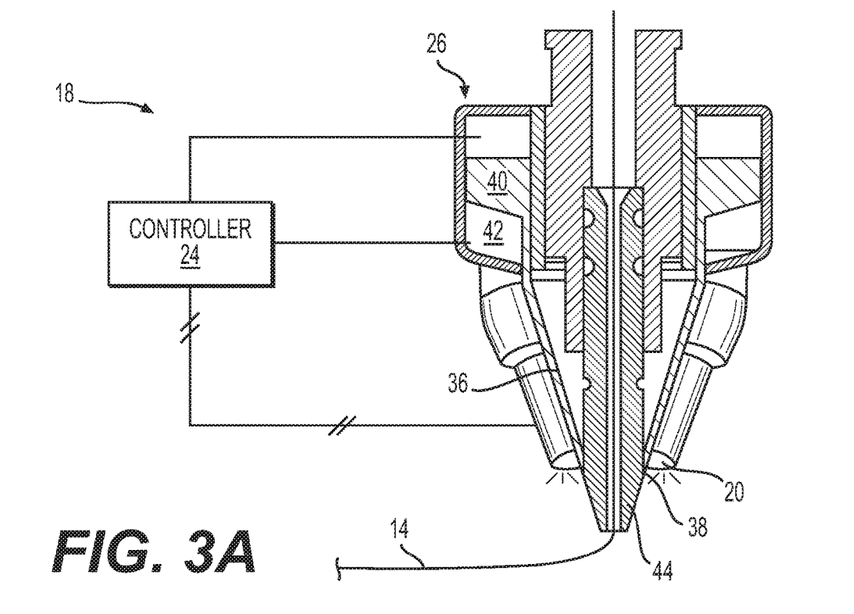
FIGS. 3A, 3B, 4, 5A, 5B, and 6 are diagrammatic illustrations of exemplary disclosed heads that may be used in conjunction with the manufacturing systems of FIGS. 1 and 2.
Figure 3B:
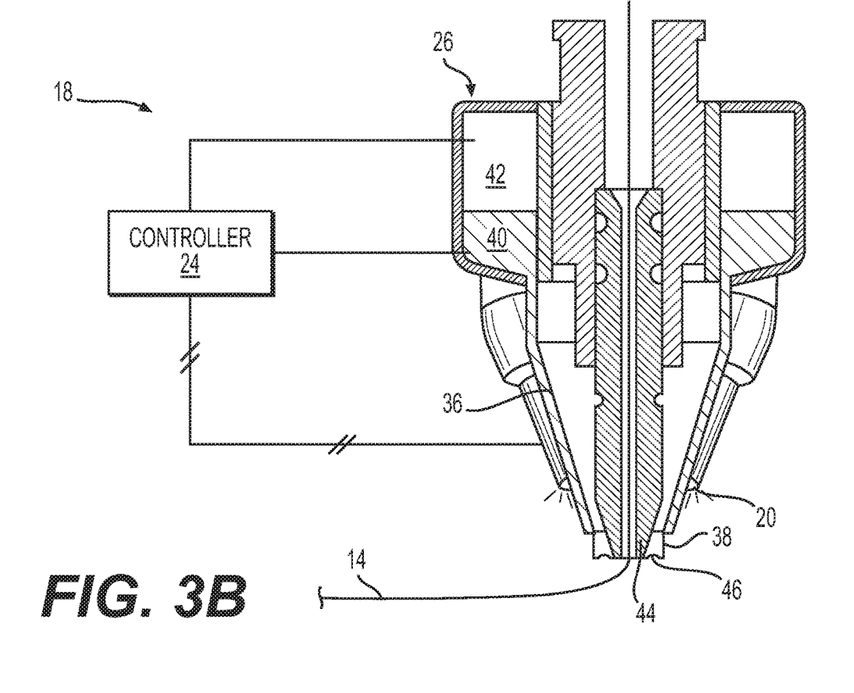

Another exemplary embodiment of head 18 and cutting mechanism 26 is illustrated in FIGS. 3A and 3B. In this embodiment, cutting mechanism 26 includes, among other things, a punch 36 having a cutting edge 38 located at a tip end and a piston 40 located at a base end inside of a control chamber 42. Punch 36 may be radially disposed between a nozzle 44 of head 18 and cure enhancers 20. In the disclosed embodiment, cutting edge 38 of punch 36 is an annular blade, which at least partially or completely surrounds nozzle 44 of head 18. Cutting edge 38 may be serrated and/or include teeth 46 (shown only in FIG. 3B).

Controller 24 may be configured to regulate movement of punch 36, for example by selectively directing a control fluid (e.g., air, hydraulic oil, etc.) into and/or out of control chamber 42 at opposing ends of piston 40. This may create a pressure differential across piston 40 that causes piston 40 to move punch 36 from a retracted position (shown in FIG. 3A) to an extended position (shown in FIG. 3B). When punch 36 is in the extended position, teeth 46 may engage and thereby sever the material discharging from head 18.

It is contemplated that, in some embodiments, punch 36 may also be configured to rotate. For example, the control fluid described above could be directed through a turbine (not shown) that is connected to piston 40, thereby causing piston 40 and/or cutting edge 38 to rotate. It should be noted that another means of actuation (e.g., a non-fluid driven means such as an electric motor) could be used to move and/or rotate punch 36. It should also be noted that punch 36 could be spring-biased to the retracted or extended position, and only controllably moved in one (i.e., the opposing) axial direction.

Figure 4:
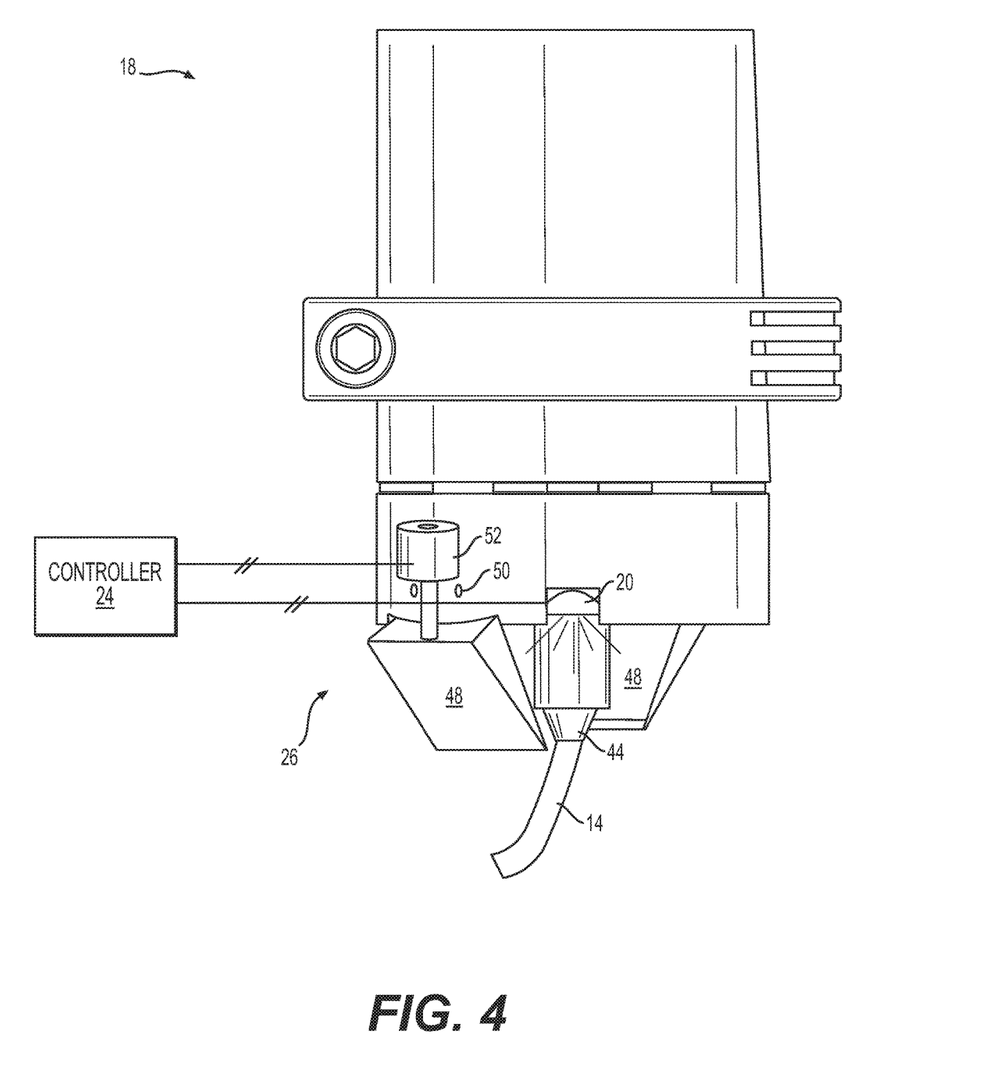

FIG. 4 illustrates another embodiment of head 18 having one or more cutting mechanisms 26. In this embodiment, cutting mechanisms 26 may be used to grasp (e.g., during anchor setting) and/or sever material discharging from head 18. Each cutting mechanism 26 may include, among other things, a wedge-shaped arm or blade 48 that is pivotally connected at a base end to a housing of head 18 (e.g., via a pivot pin 50), and an actuator 52 that is configured to engage and thereby rotate arm 48 about pivot pin 50. Actuator 52 may be a linear actuator (e.g., a pneumatic piston, a lead screw, or another similar device) that extends and retracts in response to a command from (e.g., when energized by) controller 24. During expansion, actuator 52 may push a tip end (e.g., a blunted, elastomeric, roughened, and/or sharpened end) of the associated wedge-shaped arm 48 toward the discharging material. During retraction, actuator 52 may pull the tip end away from the discharging material. When multiple mechanisms 26 are simultaneously energized (e.g., in opposition to each other), the tip ends can cooperate to pinch and/or cut completely through the discharging material, depending on a force and/or pivot angle caused by the expanding actuators 52. Controller 24 may be used to regulate operation of support 16, head 18, and/or actuators 52 during the severing and/or grasping operations.

Figure 5A:
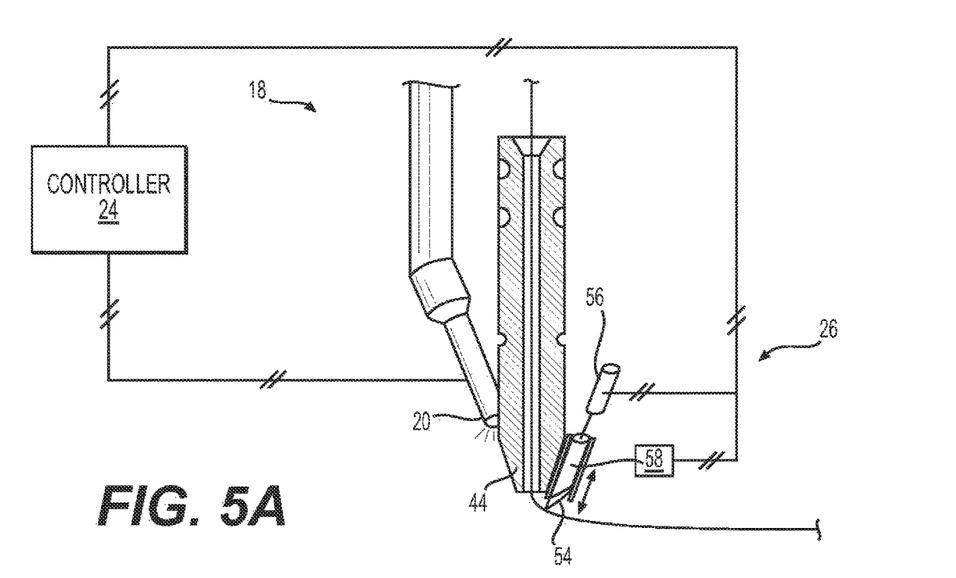
Figure 5B:
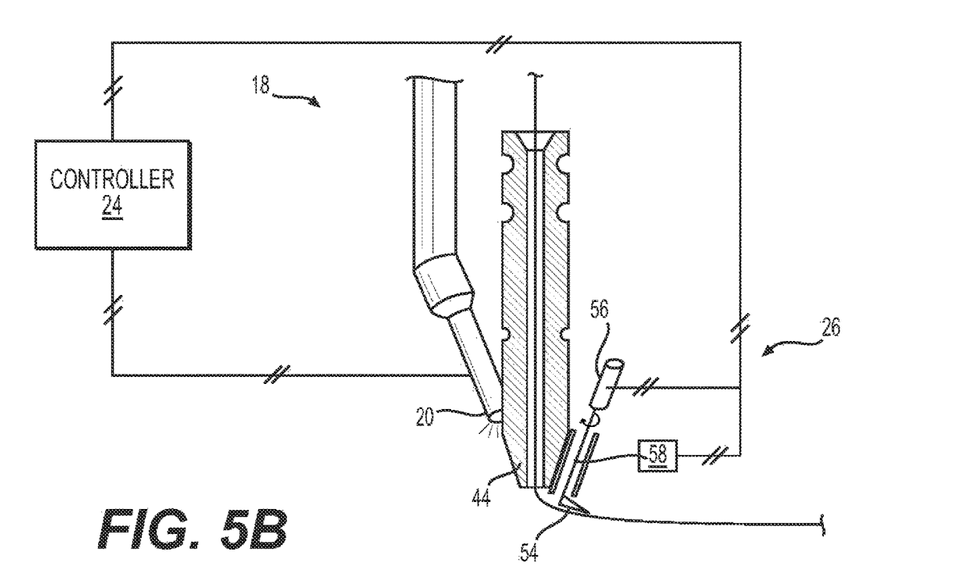

Additional exemplary embodiments of head 18 and cutting mechanism 26 are illustrated in FIGS. 5A and 5B. In these embodiments, cutting mechanism 26 includes, among other things, blade 54 that is ultrasonically vibrated and selectively moveable into engagement with the material discharging from nozzle 44. In the example of FIG. 5A, blade 54 is movable primarily in an axial direction, while in the example of FIG. 5B, blade 54 may be axially fixed and primarily rotatable about its axis. In both examples, an actuator 56 and a source of ultrasonic energy 58 may be operatively coupled with blade 54 and configured to generate the movements and vibrations described above. The vibrations within blade 54 may promote severing of the matrix-coated reinforcements, without requiring a significant translational or rotational force from actuator 56. This may help to reduce diversion of the reinforcements away from a desired trajectory. It is contemplated that ultrasonic energy sources (not shown) could be similarly associated with the other cutting mechanisms 26 described in this disclose, if desired. Controller 24 may be used to regulate operation of support 16, head 18, actuators 56, and/or sources 58 during the severing operations.

Figure 6:
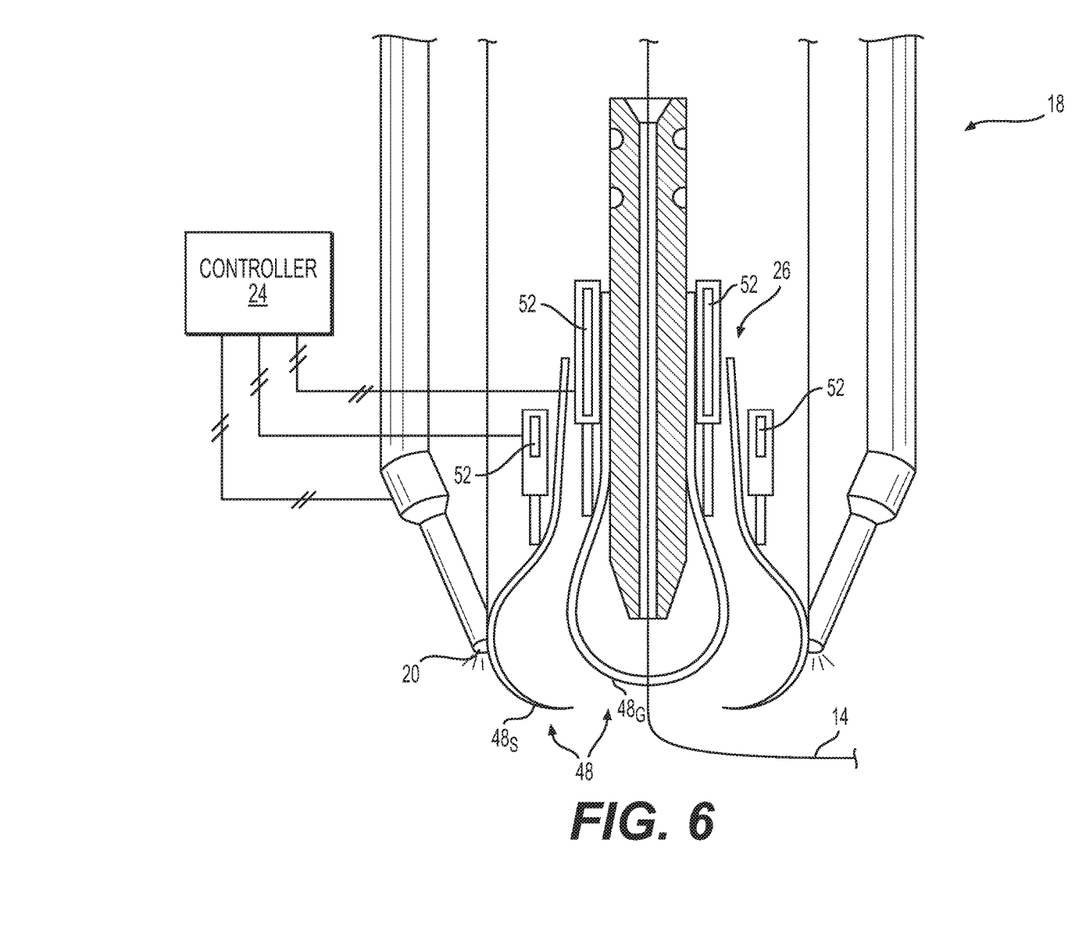

FIG. 6 illustrates a final embodiment of head 18 that is similar to the embodiment of FIG. 4. Like the embodiment of FIG. 4, head 18 of FIG. 6 may include one or more arms 48 that are selectively moved by one or more linear actuators 52 to grasp and/or sever the material discharging from nozzle 44. In the example of FIG. 6, two sets of opposing arms 48 are shown, including a grasping or inner set $48_G$, and a severing or outer set $48_S$. In contrast to the embodiment of FIG. 4, arms $48_G$ and $48_S$ may not pivot about associated pins 50. Instead, arms $48_G$ and $48_S$ may be flexible and curved, and actuators 52 may be configured to engage and exert pressure on bowed midpoints of the arms, thereby causing the arms to deflect (e.g., deform, bend, elongate, stretch, etc.) radially inward toward the reinforcements. In one application, arms $48_G$ may have blunted, abrasive, and/or resilient (e.g., rubber) tips that engage and grasp the reinforcements; while arms $48_S$ may have hardened and/or sharpened tips that pierce and/or sever the reinforcements. It is contemplated that different actuators 52 may be independently energized by controller 24 to selectively implement grasping only, severing only, or both grasping and severing. It is also contemplated that a single actuator 52 could be used to simultaneously move both grasping and severing arms $48_G$, $48_S$, if desired. In this configuration, a movement amount and/or force could be varied to implement grasping, severing, or both grasping and severing.

INDUSTRIAL APPLICABILITY

The disclosed systems may be used to continuously manufacture composite structures having any desired cross-sectional shape, length, density, and/or strength. The composite structures may include any number of different reinforcements of the same or different types, diameters, shapes, configurations, and consists. In addition, the disclosed systems may facilitate quick and simple start of a new printing process, and clean termination of an ongoing printing process. Operation of systems 10 and 12 will now be described in detail.

At a start of a manufacturing event, information regarding a desired structure 14 may be loaded into systems 10 and 12 (e.g., into controller 24 that is responsible for regulating operations of support 16 and/or head 18). This information may include, among other things, a size (e.g., diameter, wall thickness, length, etc.), a contour (e.g., a trajectory), surface features (e.g., ridge size, location, thickness, length; flange size, location, thickness, length; etc.), connection geometry (e.g., locations and sizes of couplings, tees, splices, etc.), desired weave patterns, weave transition locations, location-specific matrix stipulations, location-specific reinforcement stipulations, etc. It should be noted that this information may alternatively or additionally be loaded into systems 10 and 12 at different times and/or continuously during the manufacturing event, if desired. Based on the component information, one or more different reinforcements and/or matrix materials may be selectively installed into head 18 and/or continuously supplied to systems 10 and 12. In some embodiments, the reinforcements may also need to be connected to a pulling machine (not shown) and/or to a mounting fixture (e.g., to anchor point 22). Installation of the matrix material may include filling head 18 and/or coupling of an extruder (not shown) to head 18.

Connection of the reinforcements to anchor point 22 may be completed automatically, in some situations. For example, the cutting mechanism(s) 26 of FIGS. 4 and/or 6 may be caused by controller 24 to grasp the associated matrix-wetted reinforcements protruding from head 18, and to hold onto the reinforcements during movement of head 18 toward anchor point 22. Grasping may be accomplished by actuator(s) 52 being selectively energized by controller 24, resulting in inward pivoting or deflecting of arms 48. As arms 48 move radially inward, tips of the arms may be caused to pinch reinforcements protruding from head 18. Head 18 may then be moved by support 16 under the regulation of controller 24 to cause the held reinforcements to be placed against or on a corresponding anchor point 22. Cure enhancers 20 may then be selectively activated to cause hardening of the matrix material surrounding the reinforcements, thereby bonding the reinforcements to anchor point 22.

The component information may then be used to control operation of systems 10 and 12. For example, the reinforcements may be pulled and/or pushed from head 18 (along with the matrix material), while support 16 selectively moves head 18 in a desired manner, such that an axis of the resulting structure 14 follows a desired trajectory (e.g., a free-space, unsupported, 3-D trajectory). A desired amount of energy from cure enhancer(s) 20 may be absorbed by the discharging material, thereby initiating and/or completing curing of the associated matrix. Once structure 14 has grown to a desired length, structure 14 may be disconnected (e.g., severed) from head 18 in any desired manner.

Severing of structure 14 from head 18 (and vice versa) may be accomplished by cutting mechanism(s) 26 of any of FIGS. 1-6, under the regulation of controller 24. For example, controller 24 may selectively activate energy source 28 (referring to FIG. 1), initiate rotation and/or plunging of rotary cutter 34 (referring to FIG. 2), cause extension of punch 36 (referring to FIG. 3), pivot arms 48 (referring to FIG. 4), vibrate and/or move blade 54 (referring to FIGS. 5A and 5B), and/or inwardly deflect arms $48_S$ (referring to FIG. 6) to cut off any reinforcements protruding from head 18, leaving structure 14 untethered.

It will be apparent to those skilled in the art that various modifications and variations can be made to the disclosed systems and head. Other embodiments will be apparent to those skilled in the art from consideration of the specification and practice of the disclosed systems and heads. For example, it is contemplated that any two or more of the cutting mechanisms described above could be combined and used together, if desired. For instance, cutting mechanism 26 of FIG. 4 and/or the grasping portion of cutting mechanism 26 of FIG. 6 could be used for only grasping purposes, with cutting operations being performed by the laser/prism type cutting mechanism 26 of FIG. 1, if desired. Alternatively, the laser/prism type cutting mechanism 26 may be used in a particular situation (e.g., during metallic fiber cutting, during ribbon cutting, during sheet cutting, etc.), while another cutting mechanism 26 may be used in another situation (e.g., during non-metallic and/or single-fiber cutting). It is intended that the specification and examples be considered as exemplary only, with a true scope being indicated by the following claims and their equivalents.

What is claimed is:

1. An additive manufacturing system, comprising:
   a head having a nozzle configured to discharge a composite material including a matrix and a continuous reinforcement;
   a cure enhancer configured to enhance curing of the matrix;
   a support configured to move the head during discharging to create a structure having a three-dimensional trajectory; and
   a cutting mechanism operatively mounted to at least one of the head and the support and configured to sever the continuous reinforcement after discharge from the nozzle, the cutting mechanism including a blade and an ultrasonic energy source connected to the blade, wherein:
   the blade is located at a tip end of an arm;
   an actuator is configured to actuate in an axial direction of the nozzle to move the blade radially inward toward the continuous reinforcement; and
   the blade is deformed radially inward by actuation of the actuator.

2. The additive manufacturing system of claim 1, wherein:
   the arm is one of an outer set of arms configured to sever the continuous reinforcement; and
   the cutting mechanism further includes an inner set of arms configured to grasp the continuous reinforcement.

3. The additive manufacturing system of claim 2, wherein:
   the actuator is a first actuator associated with the outer set of arms; and
   the cutting mechanism further includes a second actuator associated with the inner set of arms.

4. The additive manufacturing system of claim 3, wherein ends of the inner set of arms are at least one of blunted, elastomeric, and roughened.

5. An additive manufacturing system, comprising:
   a head having a nozzle configured to discharge a composite material including a matrix and a continuous reinforcement;
   a cure enhancer configured to enhance curing of the matrix;
   a support configured to move the head during discharging to create a structure having a three-dimensional trajectory; and
   a cutting mechanism configured to sever the continuous reinforcement after discharge from the nozzle, the cutting mechanism including:
   an arm having a cutting end; and
   an actuator connected to the head and configured to deform the arm radially inward to engage the continuous reinforcement.

6. The additive manufacturing system of claim 5, wherein:
   the arm is one of an outer set of arms configured to sever the continuous reinforcement; and
   the cutting mechanism further includes an inner set of arms configured to grasp the continuous reinforcement.

7. The additive manufacturing system of claim 6, wherein:
   ends of the inner set of arms are at least one of blunted, elastomeric, and roughened; and
   ends of the outer set of arms are at least one of hardened and sharpened.

* * * * *